Oct. 29, 1929. O. HERMANNI 1,733,260
METHOD OF MANUFACTURING FORKS WITH TWO AND MORE PRONGS
Filed June 9, 1928
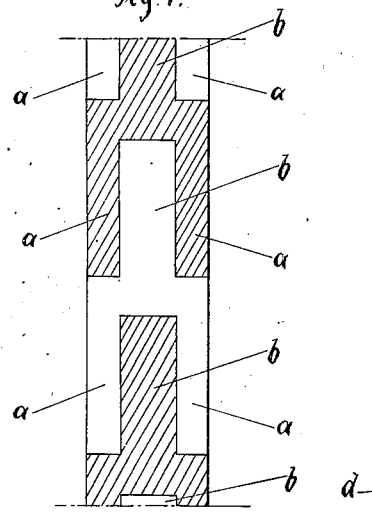
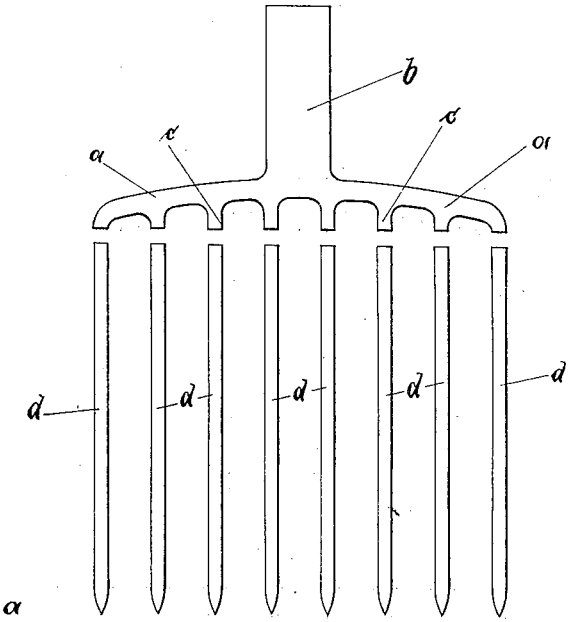
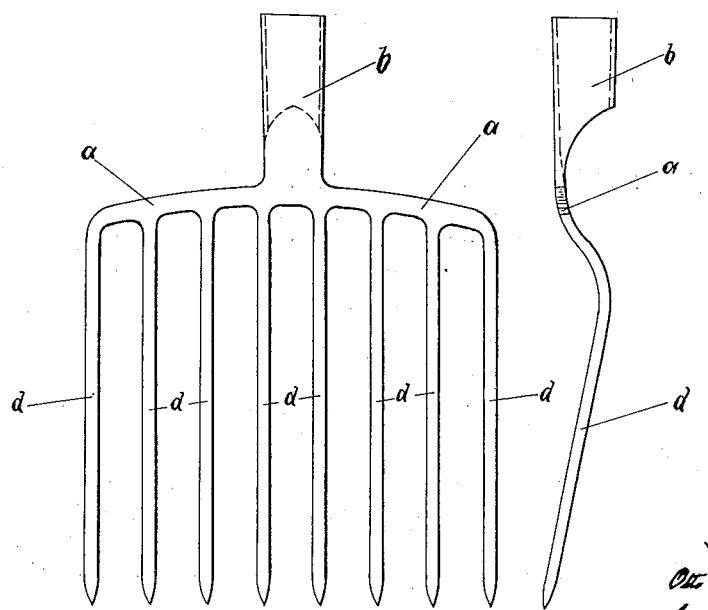

Patented Oct. 29, 1929

1,733,260

UNITED STATES PATENT OFFICE

OTTO HERMANNI, OF HAGEN, GERMANY

METHOD OF MANUFACTURING FORKS WITH TWO AND MORE PRONGS

Application filed June 9, 1928, Serial No. 284,082, and in Germany April 9, 1927.

This invention relates to a method for manufacturing hay-forks and pitchforks of any type, having two or more prongs.

The manufacturing of forks has hitherto been carried out by cutting from a strip of sheet-metal a blank which has an extension from which the handle-sleeve has to be formed and two arms designed to form the back. This blank is stretched, bent and shaped by a forging process, the prongs being subsequently fixed by welding. The middle prongs are sharpened and then connected by autogenous welding to the back, while the outer prongs are welded on the ends of the back by means of an angular extension. As in these known methods gaps are produced at the joints, these gaps are filled with welding metal. Only autogenous welding can consequently be used. This is however not reliable enough, as at the welding point cinders are easily formed which cause breakage. In the welding seam tensions are further produced which enter into effect specially at the point submitted to the greatest stress, i. e. at the point where the prongs are connected. It is further essential that the prongs are fixed on the back at correct distances the one from the other, this being rather difficult as the fork-back has no marks for this purpose. The prongs which are commonly used are of irregular shape and they must be specially made by forging.

The method, according to the invention consists in cutting the back and the extension for the sleeve in a manner known per se from a flat iron-bar so that two arms are formed which are parallel the one to the other and to the extension. These arms are subsequently bent upward and straightened, whereupon to the back the special arc-shape is given and finger-like extensions are cut out of the lower edge. These extensions are of unequal length, their ends being all situated on a straight line. The prongs which are all of the same length and shape are then welded onto said extensions at an obtuse angle, preferably by an electric welding process. The piece cut out between the arms of one blank forms the extension for the sleeve of the next following blank so that no material is lost.

The manufacturing method for a fork with eight prongs is illustrated, by way of example, in the accompanying drawing in which:

Fig. 1 shows how the blanks are cut from a flat iron bar.

Fig. 2 shows the T-shaped body formed from the blank at the second stage of the process.

Fig. 3 shows the blank after the third stage of the process and also the prongs to be welded on.

Fig. 4 shows in elevation a finished fork, a side-elevation being shown at the right of Fig. 4.

The blank comprises two arms for the back $a$ of the fork and an extension $b$ for the sleeve. These blanks are cut consecutively from a flat iron bar, as shown in Fig. 1. In this Fig. 1 the blanks $a$—$b$ are alternately shown hatched and not hatched.

The back $a$ is formed of two arms parallel the one to the other and to the extension $b$. The material cut from between the two arms of one blank forms the extension $b$ of the next following blank, so that no material is lost.

The arms $a$, $a$ of the blank are to be bent upward so that a T-shaped body is obtained as shown in Fig. 2. The back $a$ is then curved in shears or in a forging press, the finger-like extensions $c$ being cut out at the same time in the lower edge. These extensions $c$ are of different lengths, their ends being all situated on the same straight line (Fig. 3).

The prongs $d$ consist of round irons cut from a rod and are all of the same length and shape.

The several elements of a fork are clamped in a clamping device and connected the one with the other by electric welding. The extension $b$ is then flattened and curved by rolling to form a sleeve.

In this manner a fork as shown in Figs. 4 and 5 is produced.

I claim:—

1. A method of manufacturing hay-forks, pitchforks and the like, consisting in cutting from a flat iron bar blanks consisting each of two parallel arms extending from a transverse web and of an extension on the upper edge of said web, in bending said arms upward so that a T-shaped back is formed, in curving this back, and cutting finger-like extensions from the lower edge of said back, said extensions being of unequal lengths their ends being all situated on the same straight line, and in welding by electric welding process prongs to said finger-like extensions.

2. A method as specified in claim 1 in which the extension and the arms of each blank are of the same length so that a number of blanks can be cut from a flat iron bar without any loss of material.

In testimony whereof I affix my signature.

OTTO HERMANNI.